Figure 1:
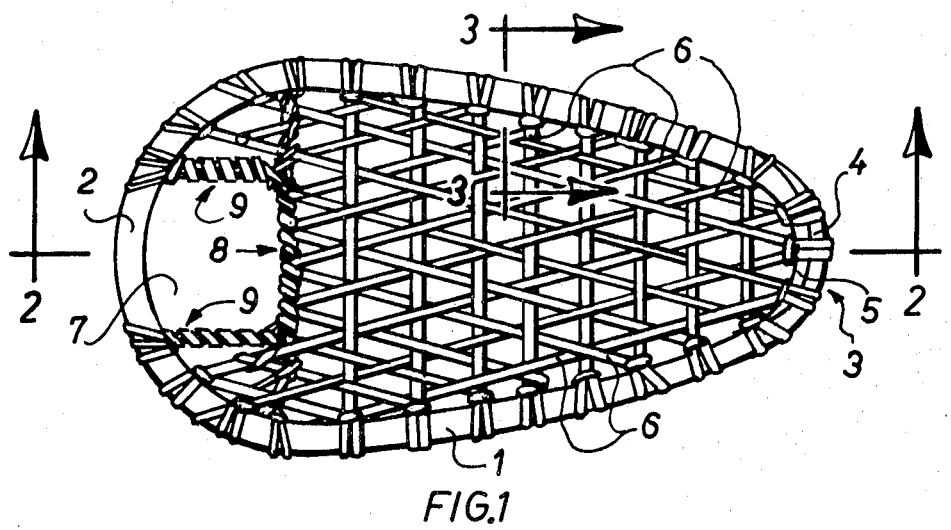

United States Patent [19]
Gros-Louis

[11] 3,798,801

[45] Mar. 26, 1974

[54] EMERGENCY SNOWSHOES IN PARTICULAR FOR STRANDED SNOWMOBILERS

[76] Inventor: Antoine Gros-Louis, 14 Des Veterans St., Duron Village, Lorette, Quebec, Canada

[22] Filed: Jan. 5, 1973

[21] Appl. No.: 321,390

[52] U.S. Cl. ............................................. 36/2.5 AB
[51] Int. Cl. ....................................................... A43b
[58] Field of Search .......... 36/2.5 R, 2.5 AA, 2.5 AB

[56] References Cited
UNITED STATES PATENTS

| | | | |
|---|---|---|---|
| 1,154,347 | 9/1915 | Sprague | 36/2.5 AB |
| 735,290 | 8/1903 | Phelps | 36/2.5 AB |
| 2,987,834 | 6/1961 | Howe | 36/2.5 AB |

Primary Examiner—Patrick D. Lawson

[57] ABSTRACT

Snowshoes particularly adapted to be taken along by snowmobilers during their journeys into the wilderness and travels through the country and arranged to be used even by a completely untrained user if his vehicle ever becomes stranded and he has to walk away for help. A snowshoe of light weight and little encumbrance having a frame forming an endless planar boundary having rounded fore and aft end sections and webbing forming a foot pivoting opening immediately adjacent the peripheral fore end section of the frame, wherein the latter is exclusively formed of a flexed bar having opposite ends which are wedged endwise and lapped one over the other whereby the cross section of the bar is preserved along the lapped ends of the latter.

2 Claims, 5 Drawing Figures

PATENTED MAR 26 1974 3,798,801

EMERGENCY SNOWSHOES IN PARTICULAR FOR STRANDED SNOWMOBILERS

This invention relates to snowshoes, and more particularly, to snowshoes which are adapted to be carried along onto a snowmobile and to be used by a passenger thereof upon stranding of his vehicle.

Snowmobiling is a sport which is now enjoying a wide-spread popularity in areas at least seasonally covered with snow. The fans or passengers of snowmobiles are exposed to serious hazards one of which being the possibility of their snowmobiles becoming stranded in a remote place during a journey into the wilderness or travel in the country. This has frequently happened and at least one passenger must then walk away into deep snow such as snowdrifts to reach for help, if he is not simply snowbound.

It is known by at least experienced snowmobilers that snowshoes can be of assistance to them, but the snowmobiles are relatively small vehicles and it is almost impossible to conveniently carry along a pair of snowshoes of the conventional type onto a snowmobile. Besides, most snowmobilers are not trained to walk with snowshoes and it has been demonstrated by experience, that they could not go very far on such snowshoes since the latter are relatively long and wide and are essentially designed to provide optimum weight bearing capacity on soft snow.

It is a general object of the invention to provide snowshoes which can easily be used by untrained persons with little expense of energy and which can be easily carried along onto a snowmobile.

It is a more specific object of the invention to provide snowshoes of little encumbrance and weight whereby to be easily carried by an untrained person without becoming excessively tired or exhausted and which can find room in the utility compartment of snowmobiles to be used in case of emergency.

It is a still more specific object of the invention to provide a snowshoe wherein the conventional transverse brace and toe portion of webbing in front of the foot pivoting opening is dispensed with wherein the latter is limited in front directly by the frame.

The invention will now be defined in details with reference to a preferred embodiment thereof which is illustrated, by way of example only, in the accompanying drawings, in which:

FIG. 1 is a plan view of a snowshoe according to the present invention.

Figure 2:
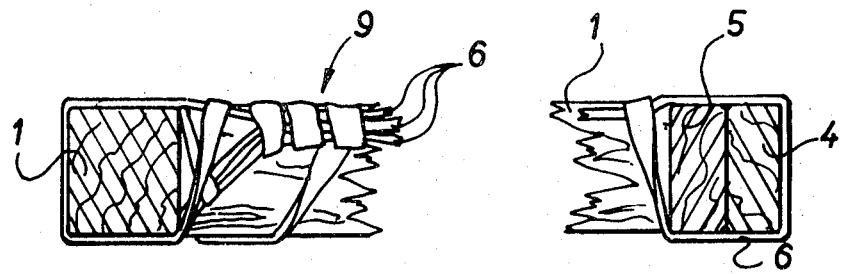
Figure 3:
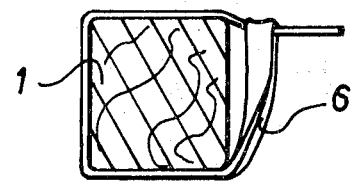

FIGS. 2 and 3 are cross-sectional views as seen along lines 2—2 and 3—3 respectively in FIG. 1.

Figure 4:
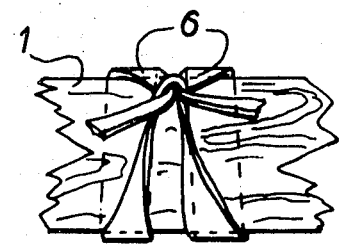
Figure 5:
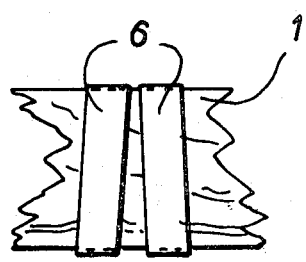

FIGS. 4 and 5 are right and left views respectively of the details shown in FIG. 3.

The illustrated overshoe includes a frame 1 forming an endless planar boundary defining a fore end section 2 and a rear end section 3 which are peripherally rounded or curved as shown whereby to dispense with long pointed ends.

The frame 1 has an elongated shape and is made of a flexed bar preferably of wood having a rectangular transverse cross section, as best shown in FIGS. 2 and 3. The opposite ends 4 and 5 of the wooden bar are wedged endwise and arranged to be lapped one against the other such as to preserve the transverse cross section of the bar along the lapped joint formed along the aft end portion 3, as can be seen in FIGS. 1 and 2.

A webbing of cowhide thongs 6 is attached by knots as shown in FIGS. 3, 4 and 5 along substantially the complete periphery of the frame 1 except along the fore end section 2 thereof. A foot pivoting opening 7, as best shown in FIG. 1 is formed by the webbing and is limited in front by the fore end section 2, at the rear by a cord 8 of twisted thongs 6, and on the sides of twisted thongs 6 by reinforcing cords 9. The cord 8 is attached at its opposite ends to the frame 1 and extends transversely of the cords 9 are each connected directly to the frame 1 at one end and to cord 8 at the other end to firmly hold the latter. It will be noted the fore end section 2 and the aft end section 3 are both rounded with the fore end section 2 having a larger radius of curvature than the aft end section 3. The side sections of the frame are substantially straight and converge in the aft direction of the frame.

Contrary to known snowshoes, the frame of the snowshoe of the present application is completely devoid of any rigid transverse bars. Also, the webbing defines only one opening, namely the foot pivoting opening 7.

It will be readily understood that changes in the details of the illustrated snowshoe are possible without departing from the spirit and scope of the invention as defined in the appended claims.

It should be noted that snowshoes according to the present invention can also advantageously be taken along in an automobile or any other vehicle to be used if the latter ever becomes stranded in a remote snow covered place.

What I claim is:

1. An emergency snow shoe particularly for a passenger of a stranded vehicle comprising an elongated frame forming an endless planar boundary and having a fore and an aft perimetrically rounded end sections, said fore rounded end section having a greater radius of curvature than said aft rounded end section, said end sections being interconnected by substantially straight side sections which converge in the aft direction, said frame being completely devoid of rigid transverse bars, and webbing peripherally attached to said frame and defining only one opening, namely a foot pivoting opening extending adjacent and along said fore end section of said frame, said foot pivoting opening being limited in front by said fore end section of said frame, at the rear by a cord of twisted thongs attached at opposite ends to said frame and extending transversely of said frame, and on each side by a cord of twisted thongs extending longitudinally of said frame and attached directly to said fore end section of said frame at one end and to said transverse cord at the other end.

2. A snow shoe as claimed in claim 1, wherein said frame is made of a flexed wooden bar having a rectangular cross-section and having opposite ends thereof tapering endwise and overlapped to preserve said rectangular cross-section, and wherein said webbing is made of interlaced cow-hide thongs.

* * * * *